United States Patent [19]

George

[11] Patent Number: 4,626,988
[45] Date of Patent: Dec. 2, 1986

[54] INSTRUCTION FETCH LOOK-ASIDE BUFFER WITH LOOP MODE CONTROL

[75] Inventor: Steven L. George, Endicott, N.Y.

[73] Assignee: International Business Machines Corporation, Armonk, N.Y.

[21] Appl. No.: 472,467

[22] Filed: Mar. 7, 1983

[51] Int. Cl.[4] .............................................. G06F 9/30
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 3,593,306 | 7/1971 | Toy | 340/172.5 |
| 3,928,857 | 12/1975 | Carter et al. | 340/172.5 |
| 4,053,948 | 10/1977 | Hogan et al. | 364/200 |
| 4,068,303 | 1/1978 | Morita | 364/200 |
| 4,145,738 | 3/1979 | Inoue et al. | 364/200 |
| 4,245,302 | 1/1981 | Amdahl | 364/200 |
| 4,400,769 | 8/1983 | Kaneda et al. | 364/200 |

Primary Examiner—James R. Hoffman
Attorney, Agent, or Firm—Curtis G. Rose; J. Bouchard; J. Jancin, Jr.

[57] ABSTRACT

A instruction fetch look-aside buffer with a loop mode control provides for reduced storage contention by storing a program loop in a look-aside buffer during normal mode operations. When the loop is to be executed again loop mode is entered and the instructions are taken directly out of the look-aside buffer without any access of storage required. If the instructions in the look-aside buffer are invalidated during loop mode or if the program loop is exited normal mode operations are resumed.

19 Claims, 4 Drawing Figures

| ADDRESS | INSTRUCTION | |
|---|---|---|
| ⋮ | ⋮ | |
| 11 ⟶ ØAF734 | LABEL: ADD R1, R2 | ⎫ |
| ØAF736 | STORE R1, DATA | ⎪ |
| ØAF73A | COMPARE R1, R3 | ⎬ 13 |
| 14 ⟶ ØAF73C | 10 ⟶ BRANCH ON COND. LOW, LABEL | ⎭ |
| 12 ⟶ ØAF74Ø | STORE R1, ANSWER | |
| ⋮ | ⋮ | |

*FIG. 1*

INSTRUCTION FETCH LOOK-ASIDE BUFFER WITH LOOP MODE CONTROL

DESCRIPTION

1. Technical Field

The invention relates to an apparatus and a method for fetching instructions in a data processing system.

2. Background Art

Processor performance is degraded by storage access conflicts. Memory contention occurs because of various storage accesses for reading instructions and operands and for storing results. These conflicts may be especially noticeable in an attached processor or multiprocessor environment. A significant amount of processor performance degradation caused by storage conflicts is due to instruction fetches. Program loops magnify this problem because these loops often make instruction fetches unnecessarily redundant. Repetitive loops frequently occur in most programs, and as a result, the same set of instructions are executed many times. The instruction fetches or prefetches then become redundant since the information read is the same as that just recently read from storage when the same loop was previously executed.

In an attempt to eliminate making some of these repetitive storage accesses to read instructions which were just recently accessed, small, fast secondary memories have been used to temporarily store the first instruction in a program loop as well as the address of the second instruction in the loop. In addition, look-ahead buffers for storing instructions prior to their use and look-behind or look-aside buffers for storing instructions which have been executed in anticipation of their further use have also been employed.

Until the present invention, however, there has been no apparatus for providing for both the look-aside storage of loop instructions and the efficient control of when and how the look-aside buffer is used to enhance processor performance. With prior systems and techniques tasks such as effectively invalidating the contents of the look-aside buffer when a program loop is exited, when an update or alteration of the loops contents is made in storage, or when virtual to real address mapping changes are made often degraded processor performance or resulted in errors due to the execution of invalid instructions.

DISCLOSURE OF THE INVENTION

The instruction fetch look-aside buffer of the present invention is integrated with an efficient mode control apparatus to significantly enhance processor performance by reducing storage contention and effectively managing the use of the look-aside buffer.

The present invention employs a look-aside buffer for storing a predetermined maximum number of instructions that may be executed in the future. In the normal mode of operation, instructions to be executed are fetched from storage into one or more instruction buffers. These instructions are then latched into an instruction register for decoding and processing. As these instructions are latched into the instruction register they are also simultaneously fed into the look-aside buffer. Low order instruction address bits are also copies into an associativity array. The array locations are addressed by a pointer register which is incremented for successive instructions. In this way a predetermined number of previously executed instructions will have been stored for possible future use. When a branch instruction is detected in the instruction counter, the target address of this branch instruction is latched into a target register. The previous contents of the target register were the target address of the immediately previous branch instruction. This previous target address is shifted from the target register into another register when a new target address is latched into the target register. Moreover, when a branch instruction is detected in the instruction counter, the source address associated with that branch instruction is stored in a source register.

Before the loop mode of operation will be entered and the normal mode exited two conditions must be met. First, the new target address and the previous target address must be equal (i.e., the same location is being branched to twice). This determination is made by comparing the contents of the target register with the contents of the register housing the previous target address.

The second condition which must be met before loop mode is entered is that the source address associated with the branch instruction detected must be within a predetermined range of the target address. This determination is made by subtracting the previous target address from the source address. The higher order bits of the resulting difference (i.e., the size of the loop) are tested for zeroes to ensure the loop size is within the predetermined allowable maximum.

After loop mode is entered instructions cease to be fetched from storage. Instead the current instruction address is compared with the partial instruction addresses which were stored in the look-aside buffer during normal mode operations. If a match is discovered, the instruction is extracted from the look-aside buffer and latched directly into the instruction register. If no match is discovered, loop mode is exited and normal operations are resumed.

Loop mode can also be exited when the instruction loop has been passed through. This is determined by comparing the current instruction address with the source address associated with the branch instruction stored in the source register. If the current instruction address is greater than or equal to the source address, loop mode is exited and normal mode operations are resumed.

In the event that loop mode is exited, an update or alteration of the contents of the look-aside buffer is made in storage, or virtual to real address mapping changes are made, the contents of the look-aside buffer will be invalidated. Such invalidation will result in no match between the current instruction and the contents of the look-aside buffer.

The present invention has several significant advantages over prior instruction fetch apparatuses and methods. The present invention provides for invalidating the contents of the look-aside buffer to prevent errors due to the execution of invalid instructions. The present invention also reduces storage contention while providing efficient management to entry to and exit from loop mode operations. The present invention also significantly enhances processor performance by the integration of a look-aside buffer with a control system capable of exploiting the redundancy inherent in the employment of program loops.

BRIEF DESCRIPTION OF THE DRAWING

FIG. 1 is an illustration of a typical program loop with a branch instruction and its associated target address and source address.

BEST MODE FOR CARRYING OUT THE INVENTION

Figure 2:
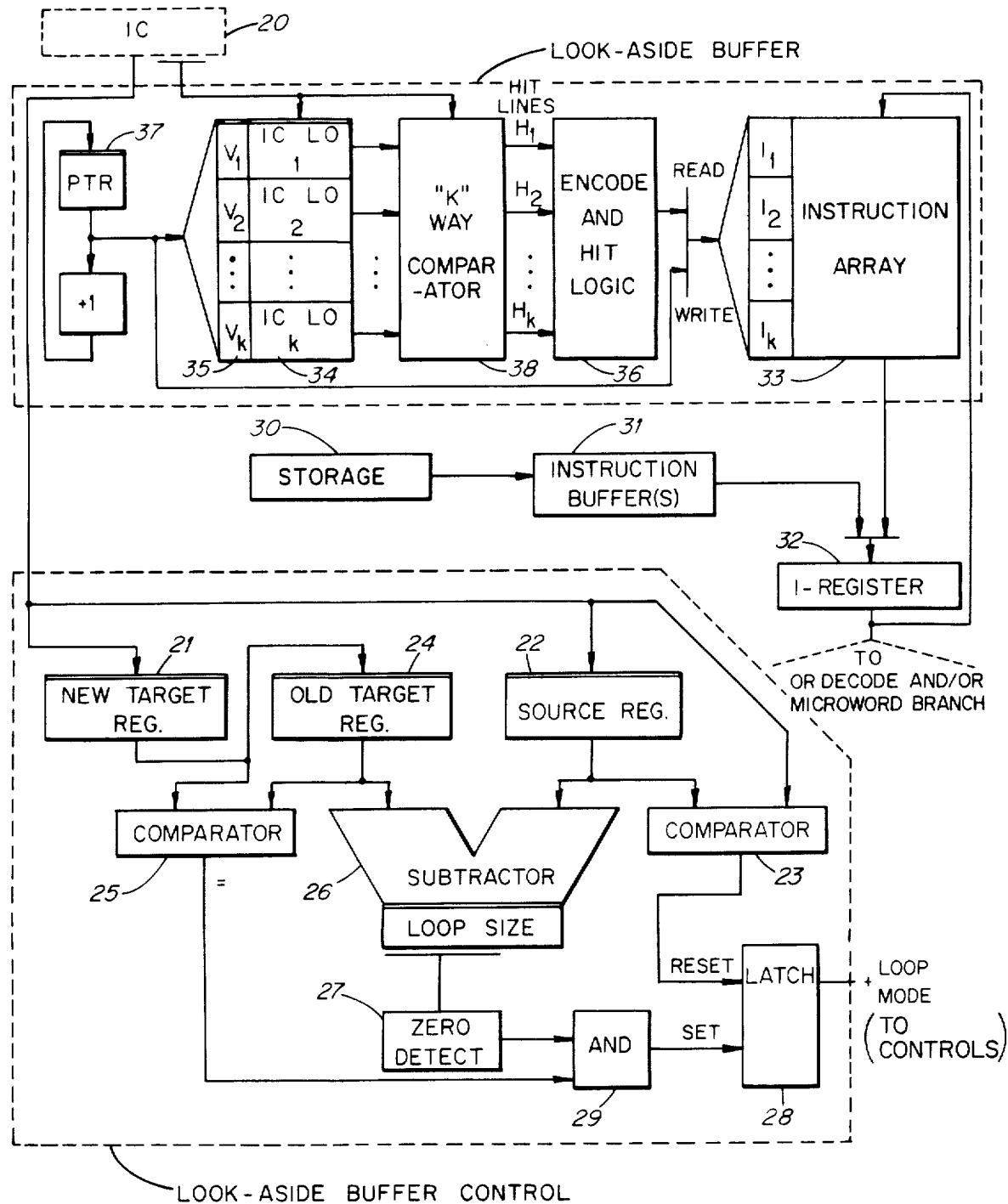
FIG. 2 is one embodiment of the instruction fetch look-aside buffer circuitry of the present invention.

Referring to FIG. 1, a potential program loop 13 is created through the use of a branch instruction 10. Branch instruction 10 has an address 14 and a target address 11. Target address 11 is the address of the next instruction to be executed after the condition required to branch (e.g., cond. low) is met. A source address 12 is also associated with branch instruction 10. If the condition required to branch set forth in branch instruction 10 is not met, program loop 13 is exited. Source address 12 is the address of the instruction following branch instruction 10. Source address 12 is thus the address of the instruction to be executed after program loop 13 is exited due to an unsuccessful branch (i.e., branch condition not met).

Referring now to FIG. 2, an instruction counter 20 is employed to store the address of the current instruction. Instruction counter 20 is updated by the central processor (not shown) so that instruction counter 20 contains the address of the current instruction or immediately after update contains the address of the next instruction.

Instruction counter 20 detects when the current address stored in instruction counter 20 is a branch instruction address. The target address of this current branch instruction is then latched into new target address register 21. As the current address is latched into register 21, the prior contents of register 21 are shifted into old target address register 24. These prior contents of register 21 are the target address of the immediately previous branch instruction. Immediately after instruction counter 20 is incremented the source address (i.e., branch instruction address plus branch instruction length) associated with the current branch instruction is latched into source address register 22.

In order to enter loop mode operations, two conditions must be met: (1) there must be branching to the same location twice in a row; and (2) the address of the current branch instruction must be within a predetermined range of the target address of the immediately previous branch instruction. The comparator 25 is used to determine if the first condition is met by comparing the contents of register 21 with the contents of register 24. The subtractor 26 and zero detect 27 determine if the second condition is met by subtracting the contents of register 24 from the contents of register 22. This difference represents the size of the loop associated with the current branch instruction. The higher order bits of this loop size are tested by zero detect 27 for zeroes. This testing ensures that the loop size is within the predetermined allowable range and that the low-order instruction address bits will be unique. Zero detect 27, source address register 22, comparator 23, subtractor 26 and AND gate 29 can be eliminated if all address bits (i.e., high-order as well as low-order) are stored in associativity array 34.

The predetermined maximum allowable range between the address of the current branch instruction and the target address of the previous instruction is chosen to maximize overall processor performance. Clearly this range is directly related to the depth of the instruction array 33 and associativity array 34 and to the lengths of instructions.

When the two conditions necessary to enter loop mode are met, latch 28 is set by the ouptut of AND gate 29. The output of latch 28 is routed to controls (not shown) which cause the data processing system and the look-aside buffer to exit normal mode operations and enter loop mode operations.

During normal mode operations, instructions to be executed are prefetched from storage 30 into instruction buffers 31. These instructions are then latched into instruction register 32 for decoding and further processing. As these instructions are latched into register 32 they are also fed into instruction array 33. No processor time is lost since array 33 is loaded in parallel with the loading of instruction register 32. In addition, the low-order address bits of each instruction fed into array 33 are fed from instruction counter 20 into associativity array 34. An incrementing pointer 37 addresses the next available row in both instruction array 33 and associativity array 34. In this manner the last K instructions and their addresses are stored in the look-aside buffer (K being the length of instruction array 33 and likewise the maximum number of instructions which can be simultaneously stored in array 33).

Valid bit flags 35 correspond to each address stored within array 34. Flags 35 allow all or some of the instructions stored in the look-aside buffer to be invalidated upon the occurrence of certain conditions or events. For example, all the instructions can be invalidated to prevent them from being interpreted as valid usable entries (i.e., a "hit") when: (1) loop mode is exited, (2) an operation result is stored in storage 30 within the current range of instructions stored in the look-aside buffer and/or (3) virtual to real address mapping is changed. Without flags 35 an instruction may be erroneously executed.

During loop mode operations instructions are not prefetched into buffers 31 and instead the current instruction low-order address bits stored in instruction counter 20 are simultaneously compared with the low-order address bit entries stored in associativity array 34 by comparator 38. If a "hit" or match occurs (i.e., the current instruction is stored in array 33) the current instruction is read out of array 33 directly into register 32 in response to the read signal generated by logic 36. In this fashion storage contention can be reduced by eliminating redundant accesses to storage. Repeated loop instructions are stored in the look-aside buffer during normal mode and read directly out of the look-aside buffer without a storage access during loop mode.

Loop mode is exited and normal mode resumed when the program loop is passed through. This is detected by comparator 23. Comparator 23 resets latch 28 and causes an exit from loop mode and entry of normal mode when the current instruction address is greater than the source address associated with the current (i.e., new) branch instruction. Put another way, loop mode is exited when the source address of the current branch instruction is less than or equal to the current instruction address.

Figure 3:
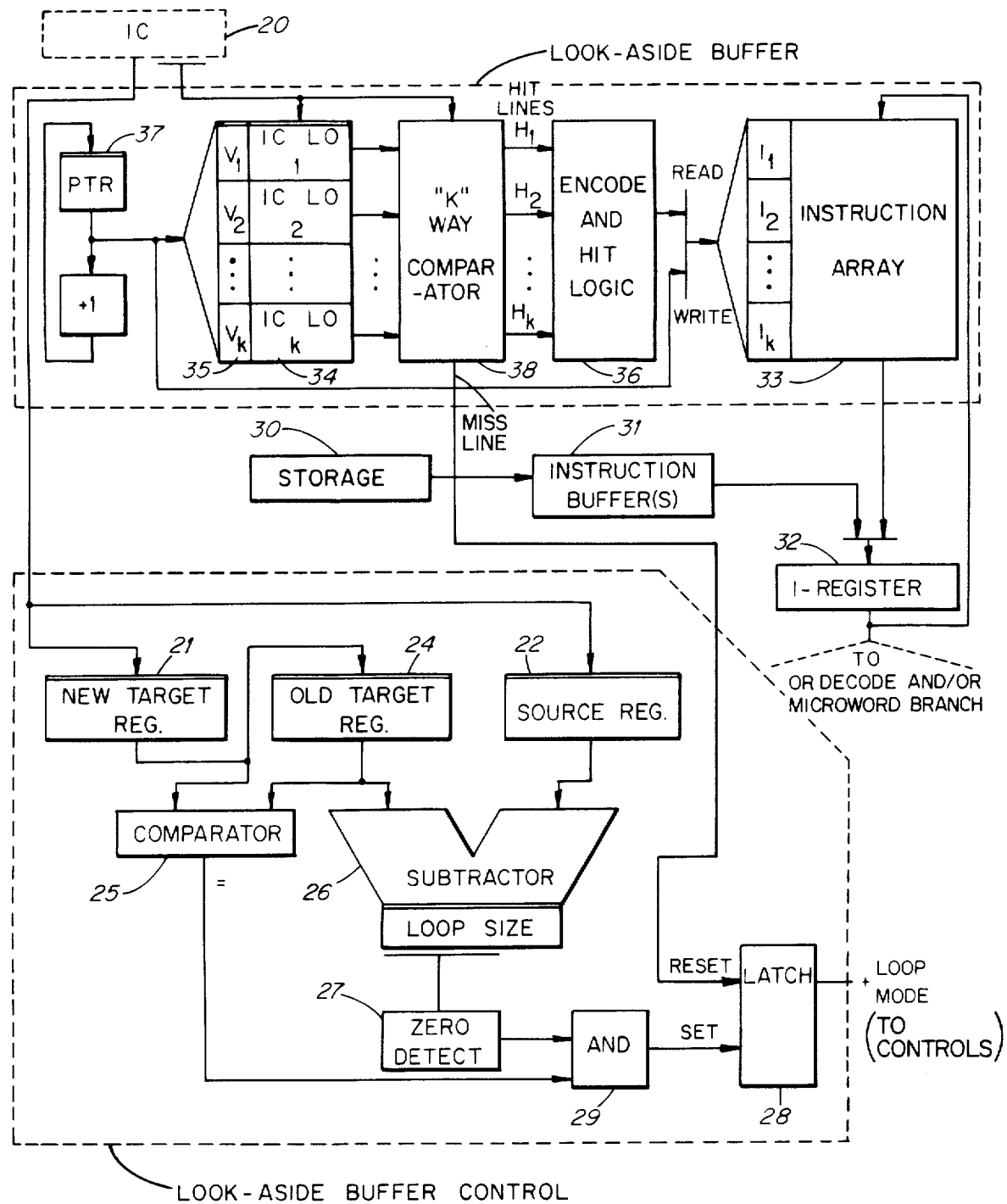
FIG. 3 is another embodiment of the present invention.

Referring now to FIG. 3, loop mode can be exited upon the occurrence of a "miss". That is, instead of exiting loop mode when the source address of the current branch instruction is less than or equal to the current instruction address as shown in FIG. 2, loop mode is exited when the current instruction address is not stored in the look-aside buffer. This embodiment of the present invention relies on a miss signal generated by comparator 38 to reset latch 28 and thereby effect a return to normal mode operations. This reset technique ensures that loop mode operations continue for as long as the current instruction can be found in array 33.

Figure 4:
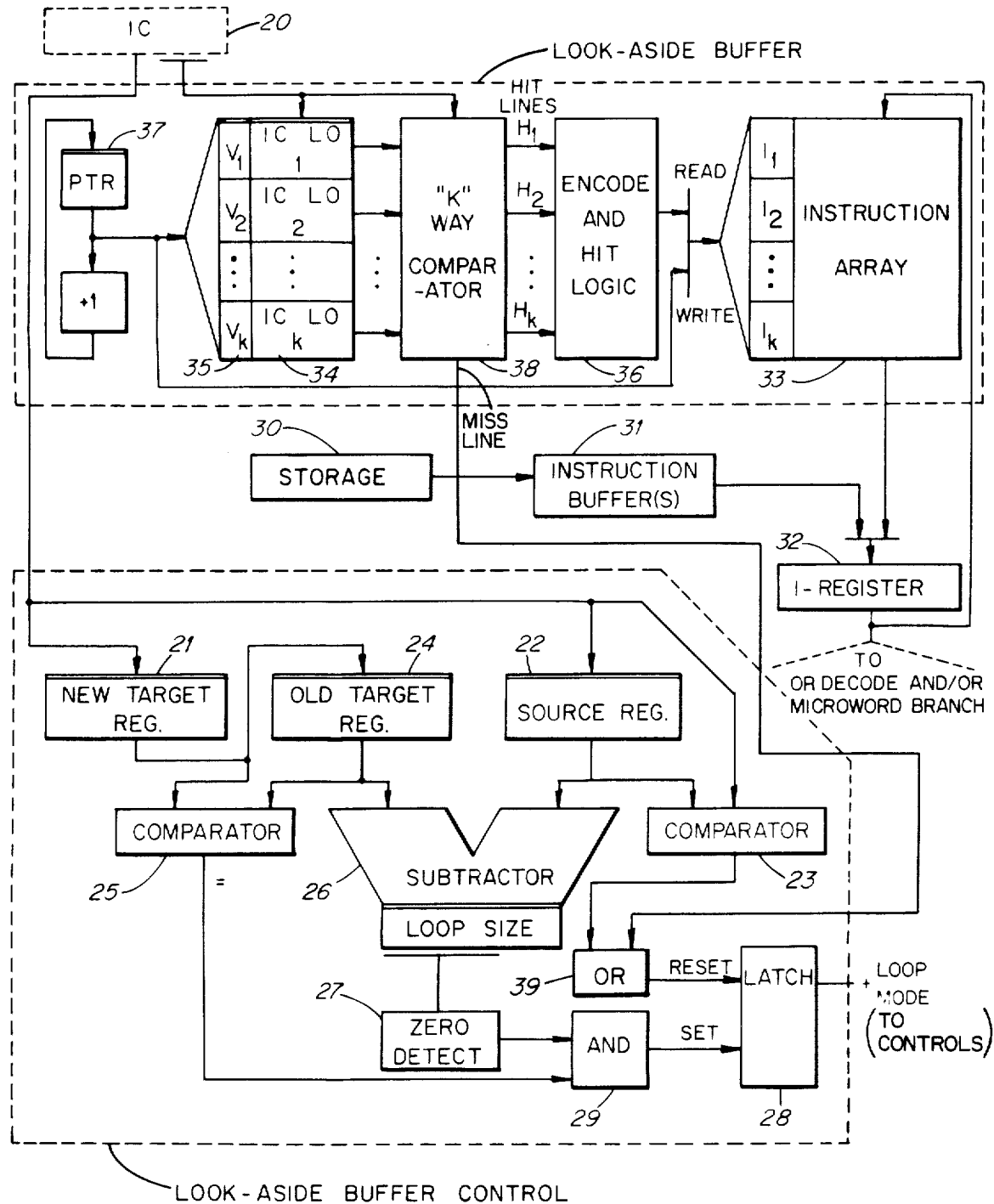
FIG. 4 is still another embodiment of the present invention.

Referring now to FIG. 4, the reset to normal mode techniques discussed above in conjunction with FIGS. 2 and 3 can be combined. In this embodiment of the present invention, the miss signal output of comparator 38 and the output of comparator 23 are fed to OR gate 39. Thus, loop mode is exited and normal mode resumed when the current instruction is not stored in array 33 or when the current instruction address is greater than or equal to the source address associated with the current branch instruction.

Whereas I have illustrated and described the preferred embodiments of my invention, it is understood that I do not limit myself to the precise constructions disclosed herein. I expressly reserve the right to all changes and modifications coming within the scope of the invention as defined in the appended claims.

I claim:

1. An instruction fetch apparatus for a data processing system, said instruction fetch apparatus having the capability of operating in either normal mode, where instructions are fetched from a storage means, or loop mode, where instructions are fetched from a look-aside buffer means, and having the capability of reducing fetch operations from said storage means when in said loop mode, comprising:

said look-aside buffer means for storing instructions prior to their execution;

control means coupled to said look-aside buffer means for placing said instruction fetch apparatus in said loop mode; said control means further comprising:

comparing means for comparing a new instruction address with a previous instruction address; said comparing means providing a first control signal when said new instruction address and said previous instruction address are equal and latch means coupled to said comparing means for enabling the extraction of instructions from said look-aside buffer means upon the presence of said first control signal.

2. An instruction fetch apparatus for a data processing system, said instruction fetch apparatus having the capability of operating in either normal mode, where instructions are fetched from a storage means, or loop mode, where instructions are fetched from a look-aside buffer means, and having the capability of reducing fetch operations from said storage means when in said loop mode, comprising:

said storage means;

an instruction counter means;

said look-aside buffer means coupled to said instruction counter means for storing instructions up to the maximum capacity of said look aside buffer means prior to their re-execution;

an instruction buffer means coupled to said storage means for storing instructions fetched from said storage means;

an instruction register means coupled to said instruction buffer means and said look-aside buffer means for facilitating the decoding and execution of instructions received from said instruction buffer means when said instruction fetch apparatus is in said normal mode and from said look-aside buffer means when said instruction fetch apparatus is in said loop mode;

control means coupled to said instruction counter means and said look-aside buffer means for placing said instruction fetch apparatus in either said normal mode or said loop mode; said control means further comprising:

a new target address register means for storing the target address of a new branch instruction;

an old target address register means for storing the target address of an old branch instruction;

a first comparing means coupled to said new target address register means and said old target address register means for providing a first control signal when the target address of said new branch instruction is equal to the target address of said old branch instruction;

a source address register means for storing the source address associated with said new branch instruction;

a subtracting and zero detect means coupled to said old target address register means and said source address register means for providing a second control signal when the difference between the target address of said old branch instruction and the source address associated with said new branch instruction is within a predetermined range;

a logic means coupled to said first comparing means and said subtracting and zero detect means for placing said instruction fetch apparatus in loop mode when both said first control signal and said second control signal are present and a second comparing means coupled to said source address register means for placing said instruction fetch apparatus in normal mode when the current instruction address is greater than or equal to the source address associated with said new branch instruction.

3. An instruction fetch apparatus according to claim 1 or 2 wherein said look-aside buffer means further includes:

an instruction array means for storing instructions up to the maximum capacity of said instruction array means that are latched into said instruction register means from said instruction buffer means during said normal mode;

an associativity array means for storing address bits corresponding to the instructions stored in said instruction array means;

a valid bit flag means coupled to said associativity array means for verifying the validity of each address stored in said associativity array;

an incrementing pointer means coupled to said valid bit flag means and said instruction array means for selecting a next sequential entry in said instruction array means and said associativity array means;

a third comparing means coupled to said associativity array means for comparing the contents of said instruction counter means with the addresses stored in said associativity array means and a hit logic means coupled to said third comparing means and said instruction array means for latching an instruction stored in said instruction array means into said instruction register means during said loop mode.

4. A method of fetching instructions in a data processing system capable of operating in either normal mode, where instructions are fetched from a storage means, or loop mode, where instructions are fetched from a lookaside buffer means comprising the steps of:

detecting a new branch instruction;

shifting a target address of an old branch instruction from a first register means to a second register means;

storing a target address of said new branch instruction in said first register means;

storing a source address associated with said new branch instruction in a third register means;

comparing said target address of said new branch instruction with said target address of said old branch instruction; generating a first control signal when said target address of said new branch instruction is equal to said target address of said old branch instruction;

subtracting said target address of said old branch instruction from said source address associated with said new branch instruction;

generating a second control signal when the difference between said target address of said old branch instruction and said source address associated with said new branch instruction is within a predetermined range and placing said data processing system in said loop mode when both said first control signal and said second control signal are present.

5. A method according to claim 4 additionally including the steps of comparing said source address associated with said new branch instruction with the address of the current instruction and placing said data processing system in said normal mode when the address of said current instruction is greater than or equal to said source address associated with said new branch instruction.

6. A method of fetching instructions in a data processing system capable of operating in either normal mode, where instructions are fetched from a storage means, or loop mode, where instructions are fetched from a lookaside buffer means comprising the steps of:

fetching instructions to be executed from said storage means;

storing said instructions in an instruction buffer means;

latching said instructions into an instruction register means while simultaneously storing said instructions in an instruction array means up to the maximum capacity of said instruction array means;

storing address bits associated with said instructions stored in said instruction array means in an associativity array means;

processing said instructions by reading said instructions from said instruction register means;

detecting a new branch instruction;

shifting a target address of an old branch instruction from a first register means to a second register means;

storing a target address of said new branch instruction in said first register means;

storing a source address associated with said new branch instruction in a third register means;

comparing said target address of said new branch instruction with said target address of said old branch instruction;

generating a first control signal when said target address of said new branch instruction is equal to said target address of said old branch instruction;

subtracting said target address of said old branch instruction from said source address associated with said new branch instruction and testing the high order bits of the difference between said target address of said old branch instruction and said source address associated with said new branch instruction for zeroes;

generating a second control signal when the difference between said target address of said old branch instruction and said source address associated with said new branch instruction is within a predetermined range;

terminating the fetching of instructions to be executed from said storage means when both said first control signal and said second control signal are present;

comparing the address of the current instruction with addresses stored in said associativity array means;

latching the instruction whose address bits in said associativity array means matches the address bits of said current instruction from said instruction array means directly into said instruction register means; and processing said instructions by reading said instructions from said instruction register means.

7. A method according to claim 6 additionally including the steps of comparing said source address associated with said new branch instruction with the address of the current instruction and resuming the fetching of instructions to be executed from said storage means and terminating the latching of instructions from said instruction array means directly into said instruction register means when the address of said current instruction is greater than or equal to said source address associated with said new branch instruction.

8. A method according to claim 6 or 7 additionally comprising the step of resuming the fetching of instructions to be executed from said storage means and terminating the latching of instructions from said instruction array means directly into said instruction register means when no match occurs between address bits of the current instruction and address bits stored in said associativity array means.

9. A method according to claim 8 further including the step of invalidating at least one of the addresses stored in said associativity array means when no match occurs between the address of the current instruction and an address stored in said associativity array means.

10. A method according to claim 8 further including the step of invalidating the entire set of addresses stored in said associativity array means when an operation result is stored in said storage means within a range of said current instruction defined by the maximum capacity of said instruction array means.

11. A method according to claim 8 further including the step of invalidating the entire set of addresses stored in said associativity array means when virtual to real address mapping is changed.

12. A method according to claim 7 further including the step of invalidating at least one of the addresses stored in said associativity array means when the address of said current instruction is greater than said source address associated with said new branch instruction.

13. A method according to claim 12 further including the step of invalidating the entire set of addresses stored in said associativity array means when an operation result is stored in said storage means within a range of said current instruction defined by the maximum capacity of said instruction array means.

14. A method according to claim 12 further including the step of invalidating the entire set of addresses stored in said associativity array means when virtual to real address mapping is changed.

15. A method according to claim 7 further including the step of invalidating the entire set of addresses stored in said associativity array means when an operation result is stored in said storage means within a range of said current instruction defined by the maximum capacity of said instruction array means.

16. A method according to claim 7 further including the step of invalidating the entire set of addresses stored in said associativity array means when virtual to real address mapping is changed.

17. An instruction fetch apparatus for a data processing system, said instruction fetch apparatus having the capability of operating in either normal mode, where instructions are fetched from a storage means, or loop mode, where instructions are fetched from a look-aside buffer means, and having the capability of reducing fetch operations from said storage means when in said loop mode, comprising:

said storage means;

an instruction counter means;

said look-aside buffer means coupled to said instruction counter means for storing instructions prior to their execution said look-aside buffer means further including a first comparing means for placing said instruction fetch apparatus in normal mode when the current instruction address in said instruction counter is not stored in said look-aside buffer means;

an instruction buffer means coupled to said storage means for storing instructions fetched from said storage means;

an instruction register means coupled to said instruction buffer means and said look-aside buffer means for facilitating the decoding and execution of instructions received from said instruction buffer means when said instruction fetch apparatus is in said normal mode and from said look-aside buffer means when said instruction fetch apparatus is in said loop mode; control means coupled to said instruction counter means and said look-aside buffer means for placing said instruction fetch apparatus in said loop mode; said control means further comprising:

a new target address register means for storing the target address of a new branch instruction;

an old target address register means for storing the target address of an old branch instruction;

a second comparing means coupled to said new target address register means and said old target address register means for providing a first control signal when the target address of said new branch instruction is equal to the target address of said old branch instruction;

a source address register means for storing the source address associated with said new branch instruction;

a subtracting and zero detect means coupled to said old target address register means and said source address register means for providing a second control signal when the difference between the target address of said old branch instruction and the source address associated with said new branch instruction is within a predetermined range; and a logic means coupled to said first comparing means and said subtracting and zero detect means for placing said instruction fetch apparatus in loop mode when both said first control signal and said second control signal are present.

18. An instruction fetch apparatus according to claim 17 wherein said look-aside buffer means further includes:

an instruction array means for storing instructions up to the maximum capacity of said instruction array means that are latched into said instruction register means from said instruction buffer means during normal mode;

an associativity array means coupled to said first comparing means for storing address bits corresponding to the instructions stored in said instruction array means;

a valid bit flag means coupled to said associativity array means for verifying the validity of each address entry stored in said associativity array;

an incrementing pointer means coupled to said valid bit flag means and said instruction array means for selecting a next sequential entry in said instruction array means and said associativity array means;

a hit logic means coupled to said first comparing means and said instruction array means for latching an instruction stored in said instruction array means into said instruction register means during said loop mode.

19. An instruction fetch apparatus according to claim 17 wherein said control means further includes a third comparing means coupled to said source address register means for placing said instruction fetch apparatus in normal mode when the current instruction address is greater than or equal to the source address associated with said new branch instruction.

* * * * *